United States Patent
Patterson et al.

(10) Patent No.: US 9,471,866 B2
(45) Date of Patent: Oct. 18, 2016

(54) ANTI-THEFT SYSTEM USED FOR CUSTOMER SERVICE

(71) Applicants: Hubert A. Patterson, Boca Raton, FL (US); Craig R. Szklany, Lighthouse Point, FL (US)

(72) Inventors: Hubert A. Patterson, Boca Raton, FL (US); Craig R. Szklany, Lighthouse Point, FL (US)

(73) Assignee: Tyco Fire and Securtiy GmbH, Neuhausen am Rheinfall (CH)

(*) Notice: Subject to any disclaimer, the term of this patent is extended or adjusted under 35 U.S.C. 154(b) by 0 days.

(21) Appl. No.: 14/589,417

(22) Filed: Jan. 5, 2015

(65) Prior Publication Data

US 2016/0196485 A1    Jul. 7, 2016

(51) Int. Cl.
| | |
|---|---|
| *G08B 13/14* | (2006.01) |
| *G06K 19/07* | (2006.01) |
| *G06Q 30/00* | (2012.01) |
| *G08B 13/24* | (2006.01) |
| G08B 15/00 | (2006.01) |

(52) U.S. Cl.
CPC ......... *G06K 19/0723* (2013.01); *G06Q 30/016* (2013.01); *G08B 13/2462* (2013.01); *G08B 13/248* (2013.01); *G08B 13/2482* (2013.01); *G08B 15/00* (2013.01)

(58) Field of Classification Search
CPC ............. G06Q 30/0641; G06Q 20/20; G08B 13/248; G08B 13/2417; G08B 13/2462; G08B 13/246; G06K 19/0723

USPC ...................................................... 340/572.1
See application file for complete search history.

(56) References Cited

U.S. PATENT DOCUMENTS

| | | | |
|---|---|---|---|
| 8,094,026 B1* | 1/2012 | Green | G08B 13/19697 235/375 |
| 2003/0135417 A1* | 7/2003 | Bodin | G06Q 20/12 705/16 |
| 2008/0001747 A1* | 1/2008 | Kangas | G06Q 10/087 340/572.1 |
| 2010/0065632 A1* | 3/2010 | Babcock | G06Q 10/08 235/385 |
| 2012/0127314 A1 | 5/2012 | Clements | |

* cited by examiner

*Primary Examiner* — Don N Vo
(74) *Attorney, Agent, or Firm* — Fox Rothschild LLP; Robert J. Sacco; Carol E. Thorstad-Forsyth

(57) ABSTRACT

Systems (100) and methods (400) for providing customer service based theft deterrent. The method comprises: identifying each item of a plurality of items that is being removed from display equipment by the person; determining whether the person is performing an action associated with a potential theft of the item that was previously removed from the display equipment by the person; and perform actions to initiate a customer service based interaction in response to a determination that the person is performing the action associated with the potential theft of the item. The customer service based interaction is initiated with the person such that the person is deterred from committing theft. Notably, the person is at a location within a facility other than at an exit of the facility when the customer service based interaction occurs.

18 Claims, 4 Drawing Sheets

ANTI-THEFT SYSTEM USED FOR CUSTOMER SERVICE

FIELD OF THE INVENTION

This document relates generally to anti-theft systems. More particularly, this document relates to anti-theft systems used for customer service.

BACKGROUND OF THE INVENTION

Conventional anti-theft systems predominantly try to catch the thief, rather than prevent or deter theft. The only deterrence is from the presence of the security tags on merchandise which implies to a customer that (s)he may be caught if (s)he tries to steal the merchandise. Most retailers do not stop possible thieves at the exit for fear of legal action or harm to the person stopping the possible thief. This lack of action negates the effectiveness of the anti-theft system or at least minimizes the effectiveness.

SUMMARY OF THE INVENTION

The present disclosure concerns implementing systems and methods for providing customer service based theft deterrent. The methods involve: identifying, by an electronic circuit, each item of a plurality of items that is being removed from display equipment by the person; determining, by the electronic circuit, whether the person is performing an action associated with a potential theft of the item that was previously removed from the display equipment by the person; and perform actions by the electronic circuit to initiate a customer service based interaction in response to a determination that the person is performing the action associated with the potential theft of the item. The customer service based interaction is initiated with the person such that the person is deterred from committing theft. Notably, the person is at a location within a facility other than at an exit of the facility when the customer service based interaction occurs.

In some scenarios, the determination as to whether the person is performing an action associated with a potential theft of the item is based on: results of operations for correlating a list of items removed from the display equipment by the person with a list of items checked-out by a store clerk on behalf of the person; results of operations for correlating a list of items detected at a point of sale station as being in the possession of the person with a list of items checked-out by a store clerk on behalf of the person; a number and a type of at least one item removed from the display equipment by the person; a location within the facility at which the person is currently located and/or a location at which the person removed the item from the display equipment; a speed and a current path of travel of the person through the facility; and/or results of operations for comparing the person's activity within the facility to pre-defined shopping patterns of thieves.

The customer service based interaction comprises at least one of the following actions: a store associate asking the person if (s)he needs assistance finding something that might be used with an item that might be stolen or an item other than the item that might be stolen; a store associate asking the person if (s)he needs anything to go with the item that might be stolen or the item other than the item that might be stolen; a store associate providing the person with information about specials or promotions associated with the item that might be stolen or the item other than the item that might be stolen; a store POS clerk asking the person if (s)he wishes to purchase the item that might be stolen; an electronic message communicated to the person's communication device suggesting items that go with the item that might be stolen or the item other than the item that might be stolen; and an electronic message communicated to the person's communication device highlighting specials or promotions in relation to the item that might be stolen or the item other than the item that might be stolen.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
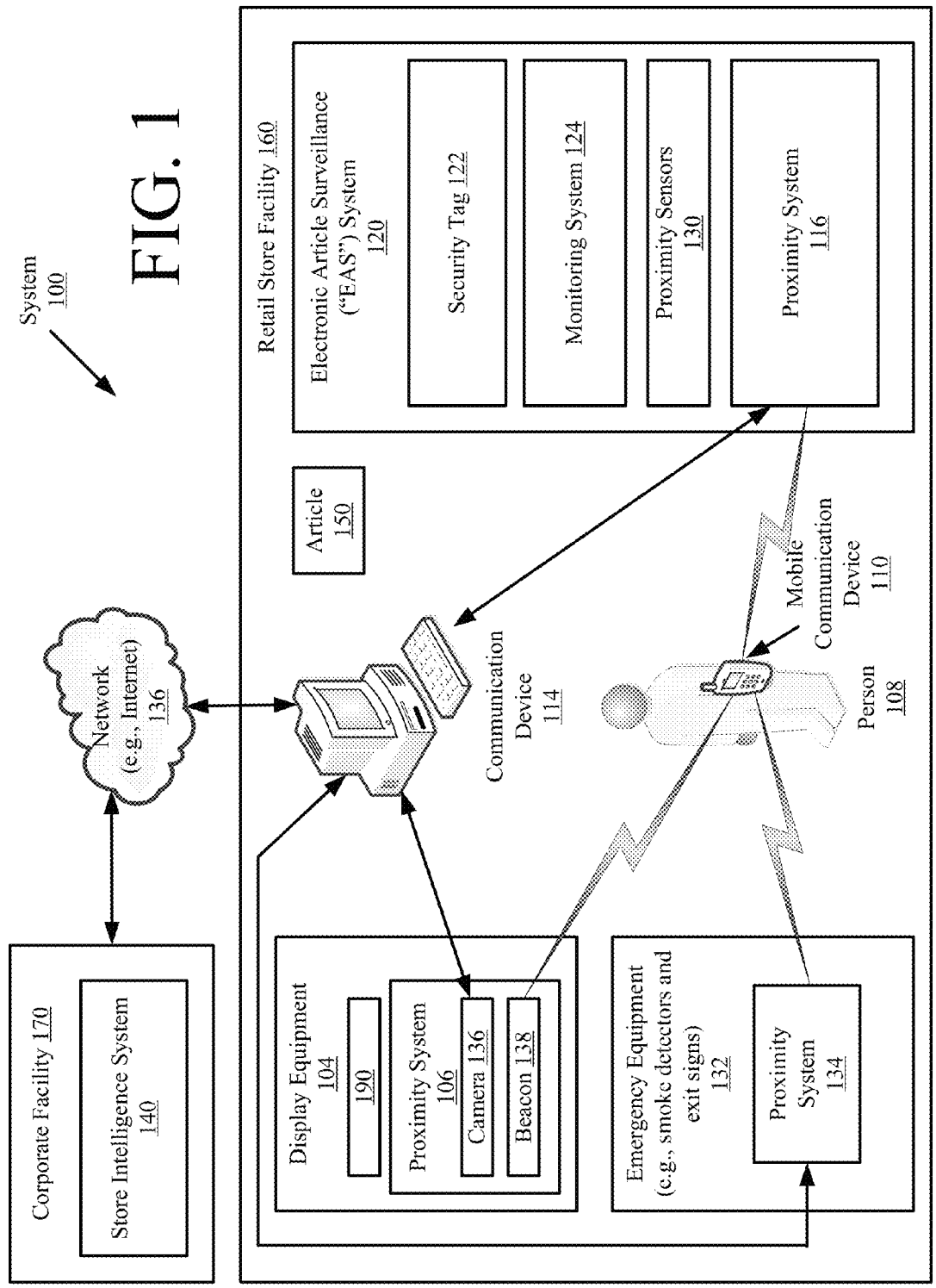
FIG. 1 is a perspective view of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Notably, a prediction of possible theft is possible by changing the way anti-theft systems work, tracking a customer in a retail store more effectively and using the gathered information before the customer exits the retail store. This prediction allows customer service interactions inside the retail store that deter the customer from actually completing a theft. As such, the present disclosure concerns systems and methods for providing customer service using an anti-theft system. Exemplary architectures for these systems and methods will be described below with respect to FIGS. 1-4.

The present disclosure generally relates to systems and methods for providing a store intelligence system using proximity systems. The proximity systems can include, but are not limited to, iBeacon® based proximity systems. iBeacon® employs Bluetooth communication technology to connect to mobile communication devices (e.g., cellular phones). Upon establishment of such connection, the iBeacon® requests and receives first information from each mobile communication device. The first information includes information which has been agreed upon by the cell user for provision to the iBeacon®. The iBeacon® can also push second information to the mobile communication device. The second information can include, but is not limited to, coupon related information which has been selected based on the store a customer is presently in or entering into. The Bluetooth technology is based on a 2.45 GHz transmission, and its data rate ranges from 1 Mbit to 24 Mbit.

Referring now to FIG. 1, there is provided a schematic illustration of an exemplary system 100 that is useful for understanding the present invention. The system 100 is generally configured to allow improved anti-theft retail store intelligence and customer service using wireless communication technology. The wireless communication technology can include, but is not limited to, Short Range Communication ("SRC") technology and/or mobile communication technology. The SRC technology includes, but is not limited to, Bluetooth technology. The mobile communication technology can include, but is not limited to, Radio Frequency ("RF") communication technology.

As shown in FIG. 1, system 100 comprises a Retail Store Facility ("RSF") 160 and a Corporate Facility ("CF") 170 which are communicatively coupled to each other via a network (e.g., the Internet) 136. Although FIG. 1 is shown as having two facilities, the present invention is not limited in this regard. For example, the facilities 160, 170 can reside in the same or different building or geographic area. Alternatively or additionally, the facilities 160, 170 can be the same or different sub-parts of a larger facility.

The RSF 160 is generally configured to provide enhanced security, store intelligence and customer service. In this regard, the RSF 160 comprises a plurality of proximity systems 106, 116, 134 disposed at various strategic locations therein. For example, a first proximity system 106 is coupled to display equipment (e.g., a promotional display or an article display cabinet). A second proximity system 116 is disposed on or in an Electronic Article Surveillance ("EAS") system 120. In this case, the second proximity system 116 may be disposed on at least one pedestal located at an exit/entry point of the RSF 160. A third proximity system 134 is disposed in or on emergency equipment (e.g., a smoke detector, an exit sign or an emergency door).

Each proximity system 106, 116, 134 comprises a beacon 138 and/or a camera 136. The beacon 138 is generally operative to communicate information to and/or from other communication devices via SRC technology (e.g., Bluetooth technology). Therefore in some scenarios, the beacon 138 comprises an iBeacon®. iBeacons® are well known in the art, and therefore will not be described in detail herein. Still, it should be understood that the iBeacon® can be used as a transmit device or as a receive device using Bluetooth technology. The camera 136 is used to obtain time stamped images of people entering, present within, and/or exiting the RSF 160.

The information communicated from the beacon 138 can include, but is not limited to, a unique identifier therefore. The unique identifier of the beacon 138 provides a means to determine the location of a person within the RSF 160. For example, let's assume that a person 108 located in the RSF 160 is in possession of a Mobile Communication Device ("MCD") 110 having an SRC application installed thereon. When the person 108 moves into proximity of the beacon 138, the beacon communicates its unique identifier to the MCD 110 via an SRC communication. Also, the camera 136 may optionally capture at least one time stamped image of the person 108, and forward the captured image to a Store Intelligence System ("SIS") 140 of the CF 170 directly (not shown in FIG. 1) or indirectly via a computing device 114. The MCD 110 sends the unique identifier of the beacon 138 and its own unique identifier (e.g., MAC address) to the SIS 140.

Notably, the SIS 140 does not need to be remote from the RSF 160 in all situations. For example, if the RSF is part of relatively small store chain, then the SIS might be located in one of the retail stores. The SIS could also be a cloud function as well. In this case, the SIS might not be located in the corporate facility 170, but rather in a server rented from a cloud provider.

At the SIS 140, various operations are performed using the two unique identifiers and/or the time stamped image. For example, the two unique identifiers and/or time stamped image are used to (1) increase the security and safety of the RSF 160, (2) track peoples paths of travel through the retail store, (3) generate a map indicating where one or more persons are located within the RSF 160, and/or (4) improve the shopping and/or check-out experience of a customer.

As noted above, the RSF 160 comprises an EAS system 120. The EAS system 120 includes a monitoring system 124 and at least one security tag 122. Although not shown in FIG. 1, the security tag 122 is attached to an article 150 for protecting the article 150 from an unauthorized removal from the RSF 160. The monitoring system 124 establishes a surveillance zone (not shown) within which the presence of the security tag 122 can be detected. The surveillance zone is established at an access point (not shown) for the RSF 160. If the security tag 122 is carried into the surveillance zone, then an alarm is triggered to indicate a possible unauthorized removal of the article 150 from the RSF 160.

During store hours, a customer may desire to purchase the article 150. The customer can purchase the article 150 via a fixed POS station (e.g., a checkout counter) or a mobile POS station (e.g., MCD 110). Once the article 150 has been successfully purchased, the security tag 122 is disabled and/or detached from the article 150. In effect, an alarm is not issued when the customer passes through the interrogation zone.

In some cases, a person may attempt to steal the article 150, and thus leave the RSF 160 with the article 150 having an activated security tag 122 coupled thereto or a maliciously deactivated secure tag 122 coupled thereto. When the person walks through the interrogation zone of the EAS system 120, an alarm may issue as discussed above. However, the person may not be stopped if (1) a number of other people (e.g., 5) pass through the interrogation zone at the same or substantially the same time and/or (2) the retail store has a policy of letting possible thieves leave the RSF for fear of legal action or harm to its employees.

Accordingly, the system 100 implements a method which allows store personnel to conduct interactions with potential thieves inside the RSF 160 well before any attempt thereby to exit the RSF. In this regard, the proximity systems 106, 116, 134 allow the RSF 160 to monitor and track customers 108 through the RSF 160. The customer tracking is achieved using unique identification information (e.g., a Media Access Control ("MAC") address) obtained from the MCD 110 being carried by the customer 108. In addition, video analytics can be used to visually track customers 108 through the RSF 160, as well as visually detect whether the customers are removing items from display equipment 104, walking around the RSF 160 or performing some action that may be associated with a potential theft. The video analytics are facilitated by cameras 136 of the proximity systems 106, 116, 134. The display equipment 104 can include, but is not limited to, promotional displays, equipment securing areas of the RSF and secure display cabinets.

The RSF 160 can obtain knowledge of what items are in the possession of each customer at any given time by (1) recognizing customers, (2) identifying items removed from display equipment by the customer, and (3) tracking movement of the customers and/or security tags affixed to the items through the RSF 160. Customer recognition can be achieved using cameras 136 and/or unique identification information obtained from MCD 110. In both scenarios, the customers may not be recognized by name, but as anonymous persons. Item removal can be identified visually using cameras 136 and/or mechanical shelf systems 190 that monitor shelf loading. Mechanical shelf systems are well known in the art, and will not be described herein. The customers can be tracked using signals (e.g., RFID or Bluetooth signals) received from the MCD 110 and/or self-checkout equipment. The security tags can be tracked using SRCs, such as RFID communications.

This knowledge can be used to correlate with a purchase at a POS station. The correlation can be achieved by comparing a list of checked-out items (i.e., a list of items scanned at a POS station) to a list of items removed from display equipment by the customer, read from the security tags in proximity to the customer, and/or read from the security tags having the same paths of travel through the RSF. Based on the comparison results, certain measures can be taken to prevent theft prior to the customer's exit of the RSF.

For example, if a customer goes to a POS station and the scanned items do not match the items identified as being removed from display equipment by the customer, then the checkout clerk can be alerted to any items missing from the checked-out items (or scanned items). The checkout clerk can then ask the customer if (s)he wishes to purchase the item that is missing from the checked-out items. This intervention occurs before the customer enters into proximity of the RSF's exit, and serves as an added deterrent to theft before the customer is in a position to leave the store while ignoring issuance of the security tag's alarm.

This knowledge can also be used to alert store personnel of a potential theft, whereby an interaction with the customer may be initiated. This customer interaction indicates thereto that the RSF is aware of the items which were removed from the display equipment thereby and/or are in his(her) possession. The customer interaction can take the form of a store associate asking if (s)he can help the customer find something that might be used with the potentially stolen item.

For example, system 100 detects that a customer removed a plurality of the same item from display equipment (e.g., ten packs of razors). The item is a high theft item. It is typical for a thief to pick up multiple packs of this item and quickly travel to the RSF's exit. However, with an alert that many items were removed from display equipment by the particular customer, a store associate can quickly be dispatched to stop the customer heading for the exit door. Upon reaching the customer, the store associate may ask if the customer needs anything to go with the particular item (e.g., razors). Such an inquiry lets the customer know that (s)he has been recognized by the retail store as having possession of the items. In addition, the information can automatically trigger a visual recording (e.g., a picture or video) of the customer and/or highlight the incident within a recording system for later retrieval and evidence.

Of course, the same information is useful for providing real customer service as well. The customer or item information allows the retail store to suggest items that go with the item(s) removed from the display equipment and/or highlight specials and discounts that might be of interest to the customer. These suggestions can either be pushed to the MCD 110 or communicated from a store associate to the customer. In this way, the customer service aspect is also useful for theft deterrence.

Figure 2:
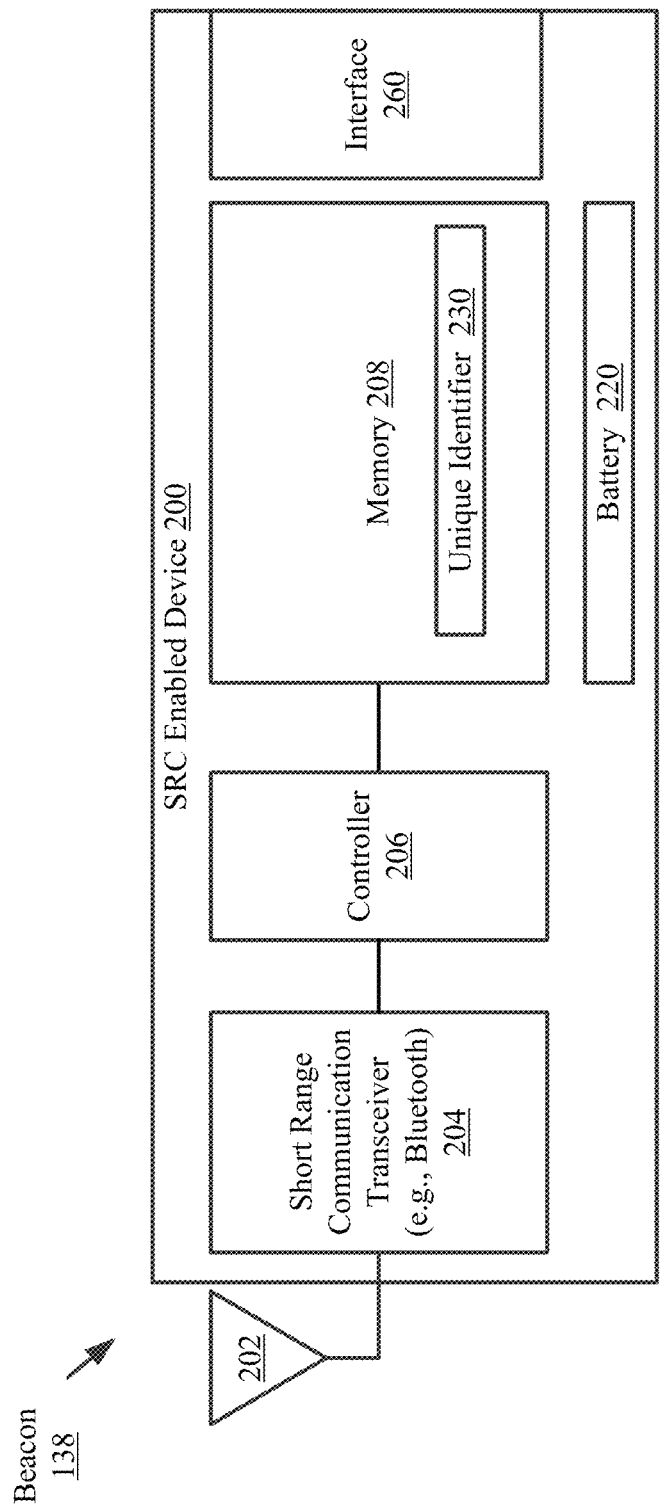
FIG. 2 is a block diagram of an exemplary architecture for a beacon shown in FIG. 1.

Referring now to FIG. 2, there is provided a schematic illustration of an exemplary architecture for beacon 138 of FIG. 1. Beacon 138 can include more or less components than that shown in FIG. 2. However, the components shown are sufficient to disclose an illustrative embodiment implementing the present invention. Some or all of the components of the beacon 138 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an embodiment of a representative beacon 138 configured to facilitate improved store intelligence. In this regard, the beacon 138 comprises an SRC enabled device 200 for allowing data to be exchanged with an external device (e.g., MCD 110 of FIG. 1) via SRC technology (e.g., Bluetooth technology). The components 204-208, 260 and a battery 220 shown in FIG. 2 may be collectively referred to herein as the SRC enabled device 200.

The SRC enabled device 200 comprises an antenna 202 for allowing data to be exchanged with the external device via SRC technology. The antenna 202 is configured to receive SRC signals from the external device and/or transmit SRC signals generated by the SRC enabled device 200. The SRC enabled device 200 comprises an SRC transceiver 204. SRC transceivers are well known in the art, and therefore will not be described herein. However, it should be understood that the SRC transceiver 204 transmits SRC signals including first information to the external device, and processes received SRC signals to extract second information therefrom. The first information includes a unique identifier 230 of the beacon 138. The unique identifier 230 provides a means for an SIS to determine the location of a person located within a given facility (e.g., RSF 160 of FIG. 1). The second information can include, but is not limited to, a unique identifier of an external device (e.g., MCD 110 of FIG. 1). The SRC transceiver 204 may pass the extracted second information to the controller 206 via interface 260.

At the controller 206, the information may be pre-processed to determine how the SRC signal is to be handled by the beacon 138. For example, the unique identifier of the external device and the unique identifier of the beacon may be forwarded to an SIS for various purposes, such as security purposes, client services purposes, access control purposes, and/or promotional purposes.

Notably, the memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Figure 3:
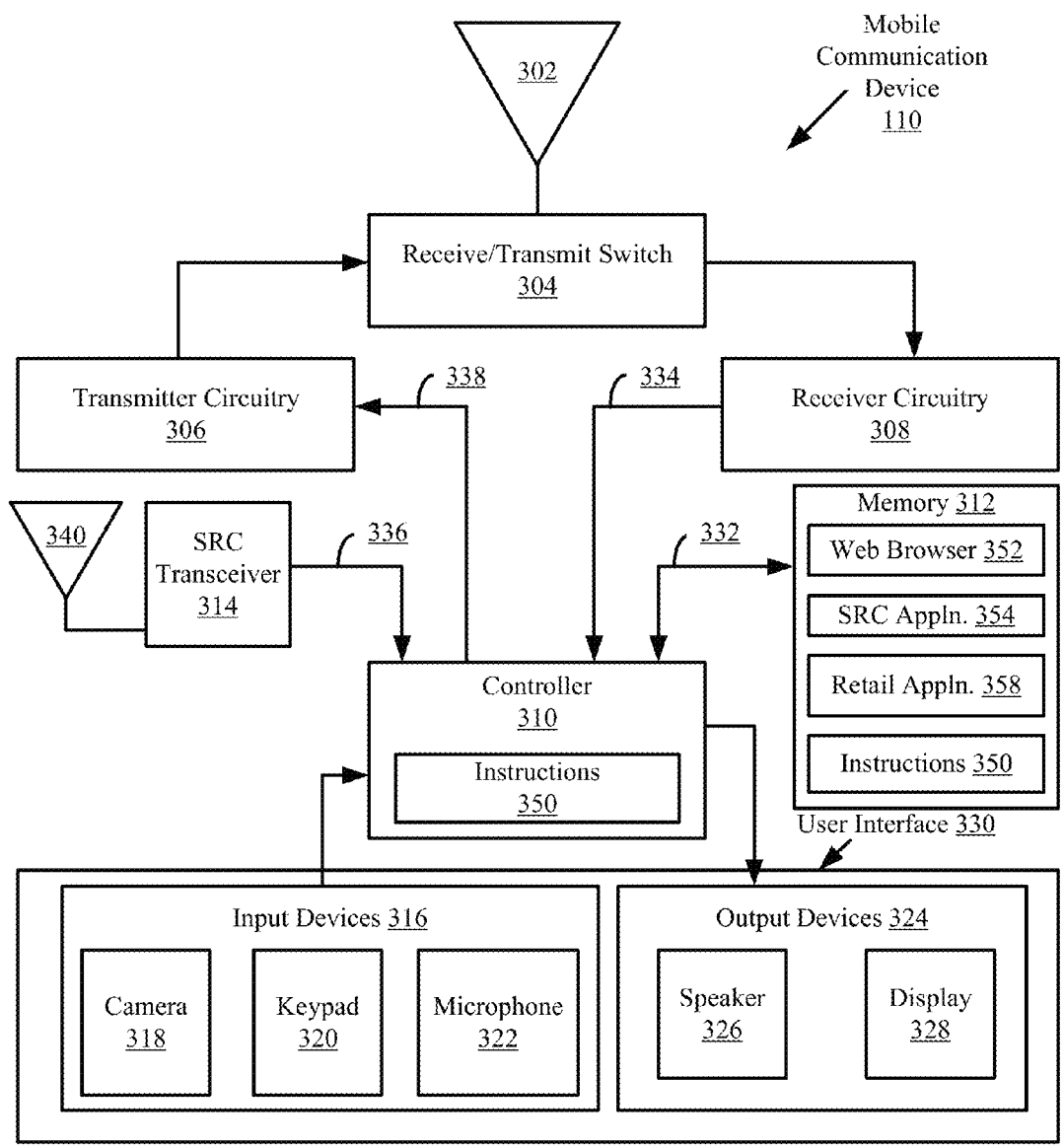
FIG. 3 is a block diagram of an exemplary architecture for a mobile communication device shown in FIG. 1.

Referring now to FIG. 3, there is provided a block diagram of an exemplary architecture for MCD 110 that is useful for understanding the present invention. MCD 110 may include more or less components than those shown in FIG. 3. However, the components shown are sufficient to disclose an illustrative embodiment implementing the present invention. Some or all of the components of the MCD 110 can be implemented in hardware, software and/or a combination of hardware and software. The hardware includes, but is not limited to, one or more electronic circuits.

MCD 110 can include, but is not limited to, a notebook computer, a personal digital assistant, a cellular phone or a mobile phone with smart device functionality (e.g., a Smartphone). In this regard, the MCD 110 comprises an antenna 302 for receiving and transmitting RF signals. A receive/transmit ("Rx/Tx") switch 304 selectively couples the antenna 302 to the transmitter circuitry 306 and the receiver circuitry 308 in a manner familiar to those skilled in the art. The receiver circuitry 308 demodulates and decodes the RF signals received from an external device. The receiver circuitry 308 is coupled to a controller (or microprocessor) 310 via an electrical connection 334. The receiver circuitry 308 provides the decoded signal information to the controller 310. The controller 310 uses the decoded RF signal information in accordance with the function(s) of the MCD 110. The controller 310 also provides information to the transmitter circuitry 306 for encoding and modulating information into RF signals. Accordingly, the controller 210 is coupled to the transmitter circuitry 306 via an electrical connection 338. The transmitter circuitry 306 communicates the RF signals to the antenna 302 for transmission to an external device via the Rx/Tx switch 304.

MCD 110 also comprises an antenna 340 coupled to an SRC transceiver 314 for receiving SRC signals. SRC transceivers are well known in the art, and therefore will not be described in detail herein. However, it should be understood that the SRC transceiver 314 processes the SRC signals to extract information therefrom. The SRC transceiver 314 may process the SRC signals in a manner defined by the SRC application 354 installed on the MCD 110. The SRC application 354 can include, but is not limited to, a Commercial Off the Shelf ("COTS") application. The SRC transceiver 314 is coupled to the controller 310 via an electrical connection 336. The controller uses the extracted information in accordance with the function(s) of the MCD 110. For example, the extracted information can be forwarded by the MCD 110 to an SIS (e.g., SIS 140 of FIG. 1) where it can be used for various purposes. Such purposes can include, but are not limited to: (1) increasing the security of the RSF 160, (2) providing promotional materials to the person, (3) providing lock codes to the person for accessing a particular area of the RSF 160 and/or articles stored in a locked display, (4) tracking peoples paths of travel through the retail store, (5) generating a map indicating where one or more persons are located within the RSF 160, and/or (6) improving the shopping and/or check-out experience of a customer.

The controller 310 may store received and extracted information in memory 312 of the MCD 110. Accordingly, the memory 312 is connected to and accessible by the controller 310 through electrical connection 332. The memory 312 may be a volatile memory and/or a non-volatile memory. For example, memory 312 can include, but is not limited to, a RAM, a DRAM, a ROM and a flash memory. The memory 312 may also comprise unsecure memory and/or secure memory. The memory 312 can be used to store various other types of data 360 therein, such as authentication information, cryptographic information, location information, and various article-related information.

As shown in FIG. 3, one or more sets of instructions 350 are stored in memory 312. The instructions may include customizable instructions and non-customizable instructions. The instructions 350 can also reside, completely or at least partially, within the controller 310 during execution thereof by MCD 110. In this regard, the memory 312 and the controller 310 can constitute machine-readable media. The term "machine-readable media", as used herein, refers to a single medium or multiple media that stores one or more sets of instructions 350. The term "machine-readable media", as used here, also refers to any medium that is capable of storing, encoding or carrying the set of instructions 350 for execution by the MCD 110 and that causes the MCD 110 to perform one or more of the methodologies of the present disclosure.

The controller 310 is also connected to a user interface 330. The user interface 330 comprises input devices 316, output devices 324 and software routines (not shown in FIG. 3) configured to allow a user to interact with and control software applications (e.g., software applications 352-258 and other software applications) installed on MCD 110. Such input and output devices may include, but are not limited to, a display 328, a speaker 326, a keypad 320, a directional pad (not shown in FIG. 3), a directional knob (not shown in FIG. 3), a microphone 322, and a camera 318. The display 328 may be designed to accept touch screen inputs. As such, user interface 330 can facilitate a user software interaction for launching applications (e.g., software applications 352-258 and other software applications) installed on MCD 110. The user interface 330 can facilitate a user-software interactive session for: initiating communications with an external device; writing data to and reading data from memory 312; initiating a retail application process for providing a user with improved customer service and/or the retail store with increased security. The retail application process will be described below in detail.

The display 328, keypad 320, directional pad (not shown in FIG. 3) and directional knob (not shown in FIG. 3) can collectively provide a user with a means to initiate one or more software applications or functions of MCD 110. The application software 352-358 can facilitate the data exchange (a) a user and the MCD 110, (b) the MCD 110 and a POS station, and/or (c) the MCD 110 and a beacon (e.g., beacon 138 of FIG. 1). In this regard, the application software 352-358 performs one or more of the following: verify the identity of a user of MCD 110 via an authentication process; present information to the user indicating this his/her identity has or has not been verified; and present a Graphical User Interface ("GUI") to the user for enabling the user to initiate a customer service process for providing the user with improved customer service when the user is in a retail store facility (e.g., RSF 150 of FIG. 1).

The application software 352-358 also performs one or more of the following: transmit a unique identifier to the beacon; receive information from a remotely located database (e.g., promotional materials); and/or display the received information on a display screen of the MCD 110. The application software 352-358 further performs one or more of the following: receive a unique identifier from a beacon; communicate the beacon's unique identifier and its unique identifier to a remotely located SIS; receive information from the SIS; and/or display the received information on a display screen of the MCD 110.

Figure 4:
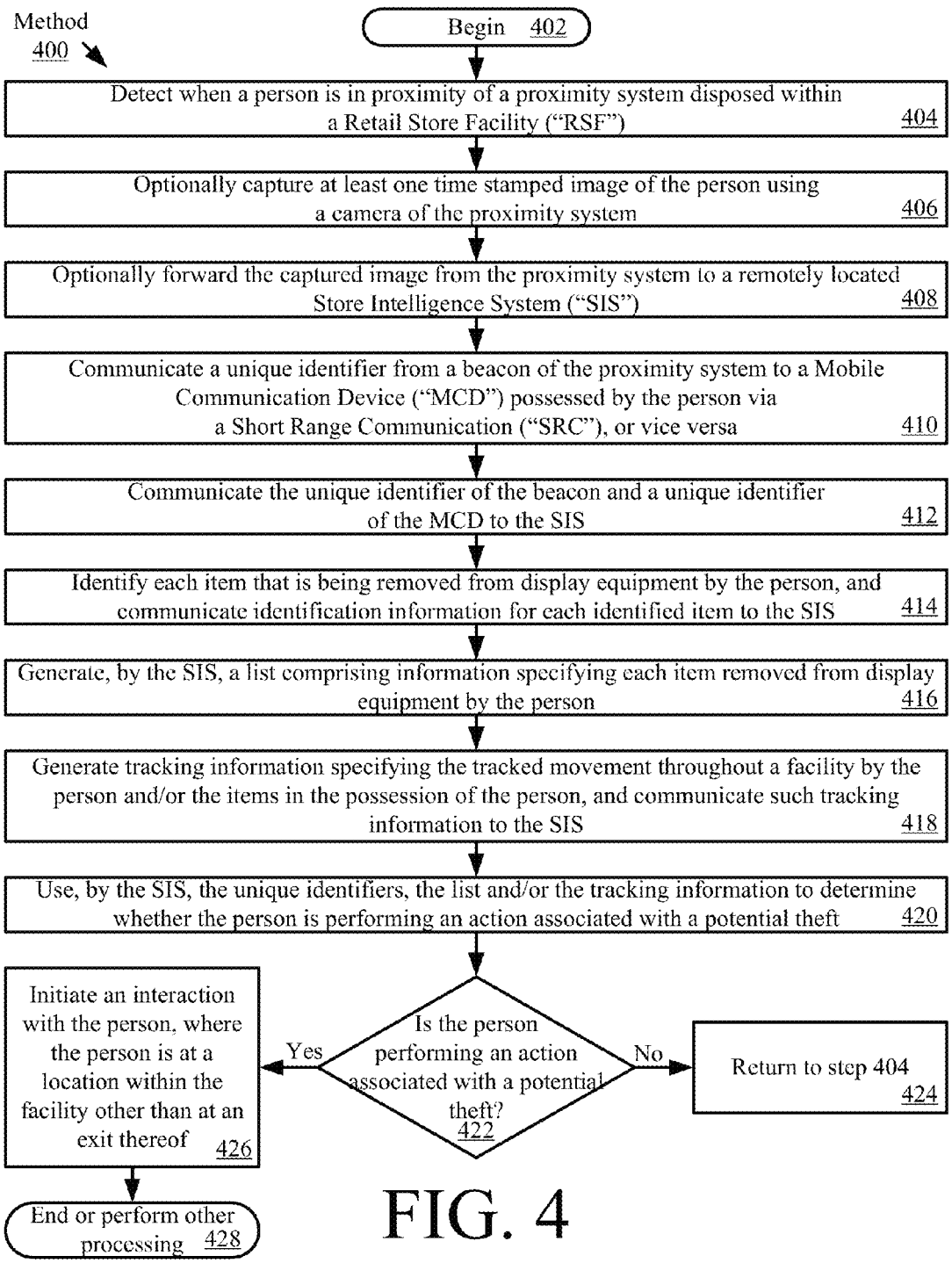
FIG. 4 is a flow diagram of an exemplary method for providing customer service based theft deterrent.

Referring now to FIG. 4, there is provided a flow diagram of an exemplary method 400 for providing customer service based theft deterrent. Method 400 begins with step 402 and continues with step 404. Step 404 involves detecting when a person (e.g., person 108 of FIG. 1) is in proximity of a proximity system (e.g., proximity system 106, 116 or 134 of FIG. 1) disposed within an RSF (e.g., RSF 160 of FIG. 1). Such detection can be made using proximity sensors (e.g., proximity sensors 130 of FIG. 1) disposed adjacent to or near the proximity system. Next in optional step 406, at least one time stamped image of the person is captured by a camera (e.g., camera 136 of FIG. 1) of the proximity system. The captured image is then optionally communicated from the proximity system to a remotely located SIS (e.g., SIS 140 of FIG. 1), as shown by step 408.

A unique identifier is communicated in step 410 from a beacon (e.g., beacon 138 of FIG. 1) of the proximity system to an MCD (e.g., MCD 110 of FIG. 1) possessed by the person via an SRC (e.g., a Bluetooth communication), or vice versa. Unique identifiers of the beacon and MCD are communicated to the SIS in step 412.

Various operations are then performed in step 414 by the proximity system to identify each item (e.g., article 150 of FIG. 1) that is being removed from display equipment (e.g., display equipment 104 of FIG. 1) by the person. These operations can include, but are not limited to, capturing visual images showing the person's activities within the RSF, and/or obtaining information from security tags (e.g., security tag 122 of FIG. 1) attached to the items being removed from the display equipment by the person. Identification information for the removed items is also sent in step 414 from the proximity system to the SIS. At the SIS, a list is generated in step 416 that comprises information specifying each item removed from the display equipment by the person.

Tracking information is also generated in step 418. The tracking information specifies the tracked movement throughout the RSF by the person and/or the items in the possession of the person. The tracking information can be generated by: periodically acquiring unique identification information from beacons of proximity systems (e.g., beacon 138 of FIG. 1), an MCD (e.g., MCD 110 of FIG. 1) possessed by the person, and/or security tags attached to the items; capturing images of the person's activities within the RSF; and/or capturing images of items being removed from display equipment by the person. The tracking information is also communicated in step 418 from the RSF to the SIS.

At the SIS, the beacon unique identifier(s), the MCD unique identifier, the list of removed items, and/or the tracking information is used to determine whether the person is performing an action associated with a potential theft, as shown by step 420. Such a determination can be made based on (1) results of operations for correlating the list of removed items with a list of checked-out (or scanned) items, (2) results of operations for correlating a list of items detected at a POS station as being in the possession of the person with the list of check-out (or scanned) items, (3) the number and type of items removed from the display equipment by the person, (4) the location within the facility at which the person is currently location and/or the location at which the person removed an item from display equipment, (5) the speed and current path of travel of the person or a group of persons through the RSF, and/or (6) results of operations for comparing the person's activity within the RSF to pre-defined shopping patterns of thieves. With regard to criteria (3), a threshold comparison can be performed. The same or different threshold values can be selected for each type of time. With regard to criteria (4), a threshold comparison can be performed. The threshold is selected based on the risk of theft associated with a particular location within the RSF.

For example, if the list of checked-out (or scanned) items does not match the list of removed items, then the person is deemed to be performing an action associated with a potential theft. Similarly, if the person removed a multiple packs of a certain item from display equipment and/or begins traveling relatively fast towards the RSF's exit, then the person is deemed to be performing an action associated with a potential theft. Likewise, if the person's activity within the RSF substantially or approximately matches a pre-defined shopping pattern of a thief, then the person is deemed to be performing an action associated with a potential theft.

If it is determined that the person is not performing an action associated with a potential theft [422:NO], then step 424 is performed where method 400 returns to step 404. In contrast, if it is determined that the person is performing an action associated with a potential theft [422:YES], then step 426 is performed where an interaction is initiated with the person prior to when the person becomes located at the RSF's exit. For example, an interaction with the person can be initiated which indicates store personnel is aware of the items being taken thereby. This interaction can take the form of (1) a store associate asking the person if (s)he needs assistance finding something that might be used with the item that might be stolen or an item other than the item that might be stolen, (2) a store associate asking the person if (s)he needs anything to go with the item that might be stolen or an item other than the item that might be stolen, (3) a store associate providing the person with information about specials or promotions associated with the item that might be stolen or an item other than the item that might be stolen, (4) a store POS clerk asking the person if (s)he wishes to purchase the item that might be stolen, (5) an electronic message communicated to the person's MCD suggesting items that go with the item that might be stolen or an item other than the item that might be stolen, and/or (6) an electronic message communicated to the person's MCD highlighting specials or promotions in relation to the item that might be stolen or an item other than the item that might be stolen. The electronic message can include, but is not limited to, an email, a text message, or other display screen message. The interaction serves as a deterrent to theft before the person is in a position to leave the store while ignoring any associated security alarm. Notably, the interaction is customer service based which eliminates or minimizes the liability and injury concerns of the retail store in relation to theft deterrent.

Upon completing step 426, step 428 is performed where method 400 ends or other processing is performed. The other processing can involve capturing an image of the person and/or video of the incident between the store personnel and the person. The captured image and/or video is(are) communicated to the SIS for storage and later use as evidence of unlawful conduct by the person.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for providing customer service based theft deterrent, comprising:
    tracking movement of a person through an area using a unique identifier of a mobile device in the person's possession and unique identifiers of proximity systems having known different locations in the area;
    identifying, by an electronic circuit, each item of a plurality of items that is being removed from display equipment by the person;
    tracking a path of travel of each said item through the area;
    determining, by the electronic circuit, whether the person is performing an action associated with a potential theft of each said item that was previously removed from the display equipment by the person and has the same path of travel through the area as the person; and
    in response to a determination that the person is performing said action associated with the potential theft of the item, performing actions by the electronic circuit to initiate a customer service based interaction with the person such that the person is deterred from committing theft, where the person is at a location within a facility other than at an exit of the facility when the customer service based interaction occurs.

2. The method according to claim 1, wherein said determining is based on results of operations for correlating a list of items removed from the display equipment by the person with a list of items checked-out by a store clerk on behalf of the person.

3. The method according to claim 1, wherein said determining is based on results of operations for correlating a list of items detected at a point of sale station as being in the possession of the person with a list of items checked-out by a store clerk on behalf of the person.

4. The method according to claim 1, wherein said determining is based on a number and a type of at least one item removed from the display equipment by the person.

5. The method according to claim 1, wherein said determining is based on a location within the facility at which the person is currently located and/or a location at which the person removed the item from the display equipment.

6. The method according to claim 1, wherein said determining is based on a speed and a current path of travel of the person through the facility.

7. The method according to claim 1, wherein said determining is based on results of operations for comparing the person's activity within the facility to pre-defined shopping patterns of thieves.

8. The method according to claim 1, wherein said customer service based interaction comprises at least one of the following actions:
    a store associate asking the person if (s)he needs assistance finding something that might be used with an item that might be stolen or an item other than the item that might be stolen;
    a store associate asking the person if (s)he needs anything to go with the item that might be stolen or the item other than the item that might be stolen;
    a store associate providing the person with information about specials or promotions associated with the item that might be stolen or the item other than the item that might be stolen; and
    a store POS clerk asking the person if (s)he wishes to purchase the item that might be stolen.

9. The method according to claim 1, wherein said customer service based interaction comprises at least one of the following actions:
    an electronic message communicated to the person's communication device suggesting items that go with the item that might be stolen or the item other than the item that might be stolen; and
    an electronic message communicated to the person's communication device highlighting specials or promotions in relation to the item that might be stolen or the item other than the item that might be stolen.

10. A system, comprising:
    at least one electronic circuit configured to
        track movement of a person through an area using a unique identifier of a mobile device in the person's possession and unique identifiers of proximity systems having known different locations in an area,
        identify each item of a plurality of items that is being removed from display equipment by the person,
        tracking a path of travel of each said item through the area, determine whether the person is performing an action associated with a potential theft of each said item that was previously removed from the display equipment by the person and has the same path of travel through the area as the person, and in response to a determination that the person is performing said action associated with the potential theft of the item, perform actions to initiate a customer service based interaction with the person such that the person is deterred from committing theft, where the person is at a location within a facility other than at an exit of the facility when the customer service based interaction occurs.

11. The system according to claim 10, wherein the determination is based on results of operations for correlating a list of items removed from the display equipment by the person with a list of items checked-out by a store clerk on behalf of the person.

12. The system according to claim 10, wherein the determination is based on results of operations for correlating a list of items detected at a point of sale station as being in the possession of the person with a list of items checked-out by a store clerk on behalf of the person.

13. The system according to claim 10, wherein the determination is based on a number and a type of at least one item removed from the display equipment by the person.

14. The system according to claim 10, wherein the determination is based on a location within the facility at which the person is currently located and/or a location at which the person removed the item from the display equipment.

15. The system according to claim 10, wherein the determination is based on a speed and a current path of travel of the person through the facility.

16. The system according to claim 10, wherein the determination is based on results of operations for comparing the person's activity within the facility to pre-defined shopping patterns of thieves.

17. The system according to claim 10, wherein said customer service based interaction comprises at least one of the following actions:
 - a store associate asking the person if (s)he needs assistance finding something that might be used with an item that might be stolen or an item other than the item that might be stolen;
 - a store associate asking the person if (s)he needs anything to go with the item that might be stolen or the item other than the item that might be stolen;
 - a store associate providing the person with information about specials or promotions associated with the item that might be stolen or the item other than the item that might be stolen; and
 - a store POS clerk asking the person if (s)he wishes to purchase the item that might be stolen.

18. The system according to claim 10, wherein said customer service based interaction comprises at least one of the following actions:
 - an electronic message communicated to the person's communication device suggesting items that go with the item that might be stolen or the item other than the item that might be stolen; and
 - an electronic message communicated to the person's communication device highlighting specials or promotions in relation to the item that might be stolen or the item other than the item that might be stolen.

* * * * *